United States Patent
Murai et al.

(10) Patent No.: US 8,115,800 B2
(45) Date of Patent: Feb. 14, 2012

(54) SERVER APPARATUS AND VIDEO DELIVERY METHOD

(75) Inventors: Shinya Murai, Kawasaki (JP);
Masataka Goto, Yokohama (JP);
Kensaku Yamaguchi, Yokohama (JP);
Yasuyuki Nishibayashi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1379 days.

(21) Appl. No.: 11/708,123

(22) Filed: Feb. 20, 2007

(65) Prior Publication Data

US 2007/0274400 A1    Nov. 29, 2007

(30) Foreign Application Priority Data

Mar. 30, 2006   (JP) .................................. 2006-095027

(51) Int. Cl.
*H04N 7/14* (2006.01)
(52) U.S. Cl. ................ 348/14.13; 348/14.12; 348/14.01; 348/14.08
(58) Field of Classification Search .... 348/14.01–14.16, 348/426.01–426.08; 375/240.02–240.08, 375/240.11–240.26; 382/232–233, 236, 382/238–240, 244–253
See application file for complete search history.

(56) References Cited

U.S. PATENT DOCUMENTS

| | | | |
|---|---|---|---|
| 5,905,524 A * | 5/1999 | Sauer | 725/54 |
| 6,115,137 A | 9/2000 | Ozawa et al. | |
| 6,373,517 B1 * | 4/2002 | Davis et al. | 348/14.08 |
| 6,377,982 B1 | 4/2002 | Rai et al. | |
| 6,393,482 B1 | 5/2002 | Rai et al. | |
| 6,400,722 B1 | 6/2002 | Chuah et al. | |
| 6,532,368 B1 | 3/2003 | Hild et al. | |
| 6,765,881 B1 | 7/2004 | Rajakarunanayake | |
| 6,961,560 B2 | 11/2005 | Hermann et al. | |
| 6,973,057 B1 | 12/2005 | Forslow | |
| 7,085,807 B2 | 8/2006 | Simpson et al. | |
| 7,117,526 B1 | 10/2006 | Short | |
| 7,237,260 B2 | 6/2007 | Yu et al. | |
| 7,263,345 B2 | 8/2007 | Kotola et al. | |
| 7,412,518 B1 | 8/2008 | Duigou et al. | |

(Continued)

FOREIGN PATENT DOCUMENTS

CN    1348130 A    5/2002

(Continued)

OTHER PUBLICATIONS

U.S. Appl. No. 10/584,753, filed Mar. 28, 2006.

(Continued)

*Primary Examiner* — Melur Ramakrishnaiah
(74) *Attorney, Agent, or Firm* — Nixon & Vanderhye, P.C.

(57) ABSTRACT

An example server apparatus includes a video stream receiver configured to receive a first video stream encoded by a first coding scheme from a video providing apparatus via a network and a video stream generator configured to generate a second video stream obtained by converting a coding scheme of the first video stream from the first coding scheme to a second coding scheme. A client capability information acquirer is configured to acquire decoding capability information representing whether a client apparatus can decode a video image encoded by the first coding scheme and a video stream processing determiner is configured to transmit the first video stream to the client apparatus when the client apparatus can decode the video image encoded by the first coding scheme, and to transmit the second video stream to the client apparatus when the client apparatus cannot decode the video image encoded by the first coding scheme.

22 Claims, 10 Drawing Sheets

U.S. PATENT DOCUMENTS

| | | |
|---|---|---|
| 7,426,393 B2 | 9/2008 | Paila |
| 7,492,777 B2 | 2/2009 | Ekberg et al. |
| 7,564,871 B2 | 7/2009 | Liu |
| 7,574,495 B1 | 8/2009 | Rajagopalan |
| 7,653,251 B2 | 1/2010 | Dei et al. |
| 7,690,018 B2 | 3/2010 | Nakagawa |
| 2001/0029531 A1 | 10/2001 | Ohta |
| 2002/0042884 A1 | 4/2002 | Wu et al. |
| 2002/0110087 A1 | 8/2002 | Zelig et al. |
| 2003/0018751 A1 | 1/2003 | Lee et al. |
| 2003/0046691 A1 | 3/2003 | Nakagawa |
| 2004/0006708 A1 | 1/2004 | Mukherjee et al. |
| 2004/0030743 A1 | 2/2004 | Hugly et al. |
| 2004/0133679 A1 | 7/2004 | Kennis et al. |
| 2004/0218535 A1 | 11/2004 | Liong et al. |
| 2005/0175020 A1 | 8/2005 | Park et al. |
| 2006/0045363 A1* | 3/2006 | Dei et al. ............... 382/232 |
| 2006/0133405 A1 | 6/2006 | Fee |
| 2007/0189486 A1 | 8/2007 | Ise |
| 2007/0288550 A1 | 12/2007 | Ise et al. |

FOREIGN PATENT DOCUMENTS

| | | |
|---|---|---|
| CN | 1741610 | 3/2006 |
| EP | 1 022 876 | 7/2000 |
| EP | 1 633 120 | 3/2006 |
| JP | 2001-204001 | 7/2001 |
| JP | 2002-304283 | 10/2002 |
| JP | 2003-153254 | 5/2003 |
| JP | 2003-288536 | 10/2003 |

OTHER PUBLICATIONS

Office Action dated Jan. 8, 2010 in Chinese Patent Application No. 2007100852887, and English-language translation thereof.

Office Action in Japanese Patent Application No. 2006-095027, dated Apr. 9, 2010, and English-language translation.

* cited by examiner

| RECEPTION PORT | DISPLAY POSITION | |
|---|---|---|
| | TOP LEFT COODINATES | BOTTOM RIGHT COODINATES |
| 20000 | (0,0) | (400,300) |
| 20002 | (500,400) | (820,640) |

SERVER APPARATUS AND VIDEO DELIVERY METHOD

CROSS-REFERENCE TO RELATED APPLICATIONS

This application is based upon and claims the benefit of priority from the prior Japanese Patent Application No. 2006-95027 filed on Mar. 30, 2006, the entire contents of which are incorporated herein by reference.

BACKGROUND OF THE INVENTION

1. Field of the Invention

The present invention relates to a server apparatus which generates a screen image to be displayed on a client apparatus connected via a network and transmits the generated screen image to the client apparatus, and a video delivery method.

2. Related Art

A server apparatus which generates a screen image to be displayed on a client apparatus connected via a network and transmits the generated screen image to the client apparatus, and a client apparatus which displays the screen image received from the server apparatus on a display unit are proposed in, for example, JP-A 2002-304283 (Kokai).

A client apparatus (for example, a display device) described in JP-A 2002-304283 (Kokai) includes a radio communication interface (IF). The client apparatus is connected to the server apparatus via a network. The client apparatus displays screen information of an application which operates on the server apparatus, and the client apparatus transmits an input command for that application to the server apparatus. As a result, it becomes possible on the client apparatus to utilize the application on the server apparatus.

However, for example, in the case where the server apparatus receives a video stream from a device connected via the network and plays the video stream, the server apparatus generates a screen image once from the received video stream, compresses the screen image again, and transmits the compressed screen image to the client apparatus. Therefore, there is a problem that a delay increases and a frame rate lowers.

SUMMARY OF THE INVENTION

According to an aspect of the present invention, there is provided with a server apparatus comprising:

a video stream receiver configured to receive a first video stream encoded by using a first coding scheme from a video providing apparatus connected via a network;

a video stream generator configured to generate a second video stream obtained by converting a coding scheme of the first video stream from the first coding scheme to a second coding scheme;

a client capability information acquirer configured to acquire decoding capability information representing whether a client apparatus can decode a video image encoded by using the first coding scheme; and a video stream processing determiner configured to transmit the first video stream to the client apparatus when the client apparatus can decode the video image encoded by using the first coding scheme, and configured to transmit the second video stream to the client apparatus when the client apparatus cannot decode the video image encoded by using the first coding scheme.

According to an aspect of the present invention, there is provided with a server apparatus comprising:

a video stream receiver configured to receive a first video stream encoded by using a first coding scheme from a video providing apparatus connected via a network;

a video stream generator configured to generate a second video stream obtained by converting a coding scheme of the first video stream from the first coding scheme to a second coding scheme;

a client capability information acquirer configured to acquire decoding capability information representing whether a client apparatus can decode a video image encoded by using the first coding scheme; and a video stream processing determiner configured to transmit a first request signal to the video providing apparatus to request transmission of the first video stream to the client apparatus, when the client apparatus can decode the video image encoded by using the first coding scheme, and transmit a second request signal to the video providing apparatus to request transmission of the first video stream to the video stream receiver and transmit the second video stream generated by the video stream generator to the client apparatus, when the client apparatus cannot decode the video image encoded by using the first coding scheme.

According to an aspect of the present invention, there is provided with a video delivery method comprising:

receiving a first video stream encoded by using a first coding scheme from a video providing apparatus connected via a network;

acquiring decoding capability information representing whether a client apparatus can decode a video image encoded by using the first coding scheme;

transmitting the first video stream to the client apparatus, when the client apparatus can decode the video image encoded by using the first coding scheme; and generating a second video stream obtained by converting a coding scheme of the first video stream from the first coding scheme to a second coding scheme and transmitting the second video stream to the client apparatus, when the client apparatus cannot decode the video image encoded by using the first coding scheme.

According to an aspect of the present invention, there is provided with a video delivery method comprising:

acquiring decoding capability information representing whether a client apparatus can decode a video image encoded by using the first coding scheme;

requesting a video providing apparatus connected via a network to transmit a first video stream encoded by using the first coding scheme to the client apparatus, when the client apparatus can decode the video image encoded by using the first coding scheme; and receiving the first video stream from the video providing apparatus, generating a second video stream obtained by converting a coding scheme of the first video stream from the first coding scheme to a second coding scheme and transmitting the second video stream to the client apparatus, when the client apparatus cannot decode the video image encoded by using the first coding scheme.

DETAILED DESCRIPTION OF THE INVENTION

Hereafter, embodiments of the present invention will be described with reference to the drawings.

First Embodiment

Figure 1:
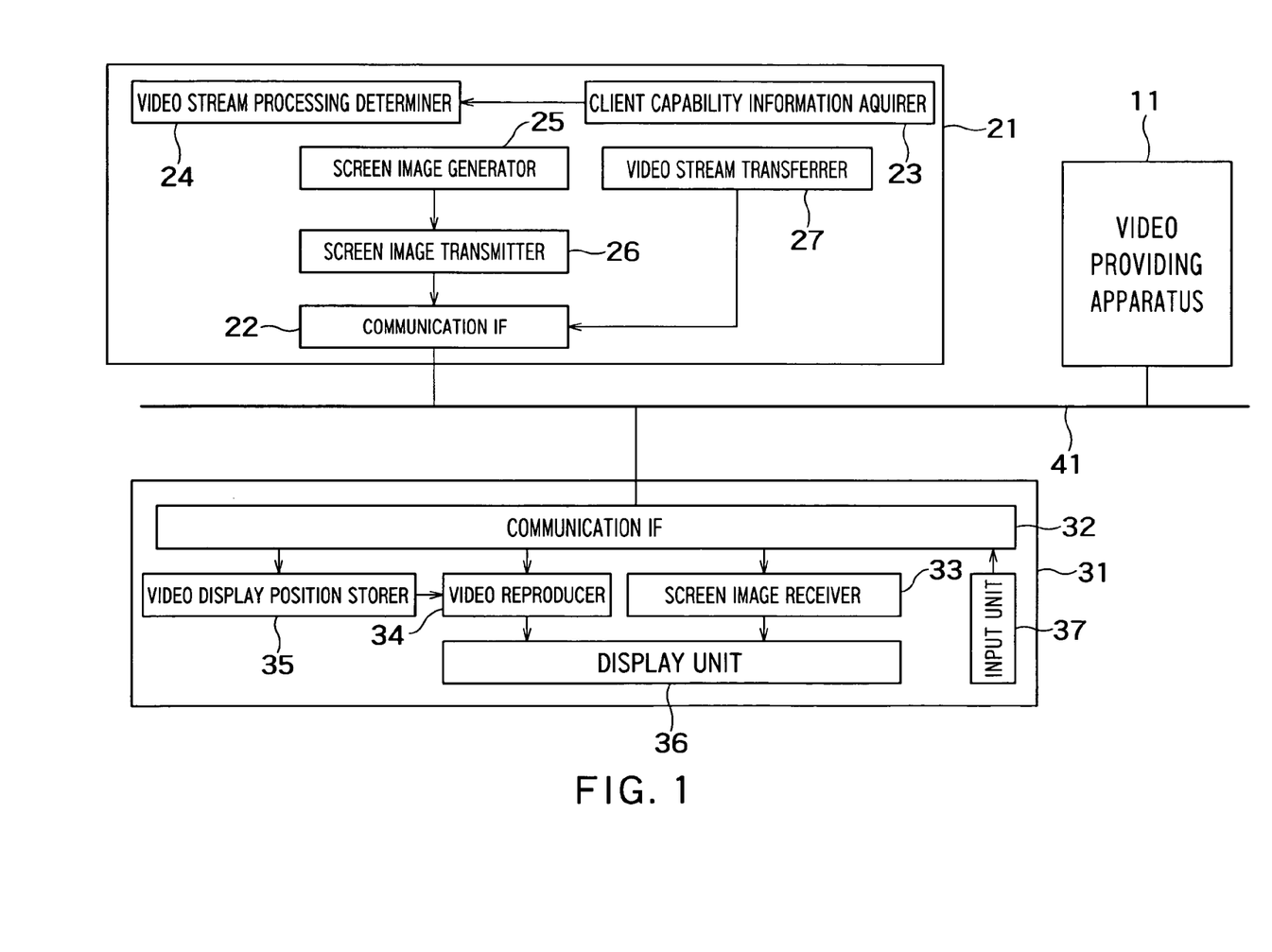
FIG. 1 is a diagram showing an example of a configuration of a video delivery system.

FIG. 1 is a block diagram showing a configuration of a video delivery system according to an embodiment of the present invention.

This video delivery system includes a video providing apparatus 11, a server apparatus 21 and a client apparatus 31. The video providing apparatus 11, the server apparatus 21 and the client apparatus 31 are connected to a network 41. The network 41 may be either of a wire network and a radio network.

The video providing apparatus 11 is, for example, a contents delivery server which delivers video contents, or a video phone (which may be either of a fixed phone and a mobile phone). The video providing apparatus 11 provides a video image to be displayed on the client apparatus 31, via the network 41. A video image transmitted from the video providing apparatus 11 is encoded by, for example, an arbitrary coding scheme, and transmitted as stream data. In view of the current situation, there is a possibility that the arbitrary coding scheme will be, for example, MPEG-4 or MPEG-2, but the arbitrary coding scheme is not restricted to them. Hereafter, a video image provided by the video providing apparatus 11 is referred to as provided video image and data representing the video image is referred to as video stream, for convenience in description.

The client apparatus 31 includes a communication interface (IF) 32, a screen image receiver 33, a video reproducer 34, a video display position storer 35, a display unit 36 and an input unit 37. The client apparatus 31 is, for example, a display device (which may be either of the fixed type and portable mobile type). The client apparatus 31 is connected to the network 41 at its communication interface 32. The client apparatus 31 receives screen image data from the server apparatus 21, decodes the received screen image data if necessary, and displays a screen image in a screen region on the display unit 36. Furthermore, the client apparatus 31 receives user's input at the input unit 37, and sends the user's input from the communication interface 32 to the server apparatus 21 via the network 41.

The screen image data received from the server apparatus 21 by the client apparatus 31 may be, for example, data representing the whole image displayed on the display unit 36. Or the screen image data may be data representing an image displayed on a part of the screen region and its display position of the display unit 36. The client apparatus 31 can display a screen image on the basis of the screen image data by using either of the above data forms or by both of the data forms.

The client apparatus 31 may be an apparatus which can receive the video stream provided by the video providing apparatus 11 via the server apparatus 21, decode the video stream, and display the decoded result on a part or the whole of the screen region. The client apparatus 31 need not support an encoding format common to that of the video providing apparatus 11. In other words, the client apparatus 31 is not restricted to an apparatus which can decode a screen image encoded by using the above-described arbitrary coding scheme (for example, MPEG-4 or MPEG-2).

The server apparatus 21 includes a communication IF 22, a client capability information acquirer 23, a video stream processing determiner 24, a screen image generator 25, a screen image transmitter 26 and a video stream transferrer 27. The communication IF 22 is equivalent to a video stream receiver. The screen image generator 25 is equivalent to a video stream generator (video stream generator). The server apparatus 21 generates a screen image to be displayed in the client apparatus 31, and transmits the generated screen image to the client apparatus 31. Screen image data which represents a screen image transmitted to the client apparatus 31 is transmitted in a format which can be handled by the client apparatus 31.

The "format which can be handled" means a format encoded by using a coding scheme which is known to be able to be decoded by the client apparatus 31. As this coding scheme, for example, MPEG-4 or MPEG-2 may be used, or run length coding, dictionary compression, JPEG compression, or another arbitrary coding scheme may be used. Furthermore, the "format which can be handled" is not restricted to an encoded format. The format may be a bit map format without especially conducting compression, as long as the client apparatus 31 can display it.

The "format which can be handled" is a format which represents the whole of an image displayed on the display unit 36 by the client apparatus 31, or a format which represents an image displayed in a part of the screen region on the display unit 36 and its display position, as long as the client apparatus 31 can handle it.

The server apparatus 21 determines a method of delivering a video image provided by the video providing apparatus 11 to the client apparatus 31 on the basis of the capability of the client apparatus 31. For example, if the client apparatus 31 can decode the video stream, the server apparatus 21 determines to transfer the video stream supplied from the video providing apparatus 11 to the client apparatus 31 without changing the coding format. If the client apparatus 31 cannot decode the video stream, the server apparatus 21 decodes the video stream, generates a screen image on the basis of a provided image obtained by decoding, converts the generated screen image to a format which can be handled by the client apparatus 31, and transmits a result to the client apparatus 31.

Hereafter, the communication IF 22, the screen image generator 25 and the screen image transmitter 26 in the server apparatus 21, and the communication IF 32, the screen image receiver 33 and the display unit 36 in the client apparatus 31 will first be described.

The screen image generator 25 generates a screen image to be displayed in the client apparatus 31. The screen image transmitter 26 transmits the screen image generated by the screen image generator 25 to the client apparatus 31 via the communication IF 22. The screen image transmitter 26 converts the screen image to the format which can be handled by the client apparatus 31, in some cases.

Figure 2:
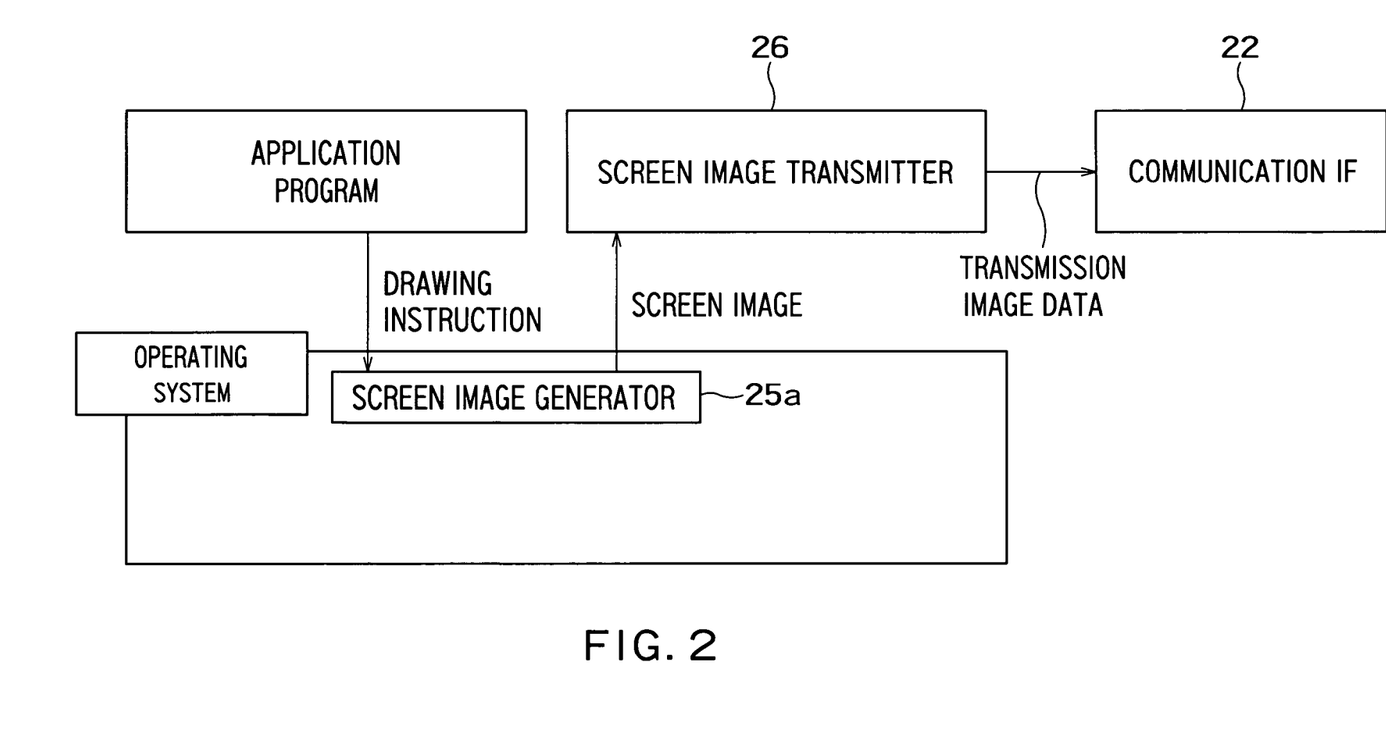
FIG. 2 is a diagram showing a configuration example of a screen image generator and a screen image transmitter.

FIG. 2 is a diagram showing an operation example of the screen image generator 25 and the screen image transmitter 26.

The server apparatus 21 in the present example is a computer in which an application program operates on an OS (Operating System). When the application program issues a drawing instruction to the OS, a screen image generator 25*a* in the OS generates a screen image (for example, an image in one region in the screen region) to be displayed on the client apparatus 31 on the basis of the given drawing instruction. The screen image generator 25*a* delivers the generated image to the screen image transmitter 26. The image delivered at this time may include information representing a position occupied by the image in the whole screen (such as a block number or coordinates of an update region). The screen image transmitter 26 converts the received image to a format which can be handled by the client apparatus 31 and delivers a resultant image to the communication IF 22. The communication IF 22 transmits the screen image having a format which can be handled by the client apparatus 31 to the client apparatus 31.

Figure 3:
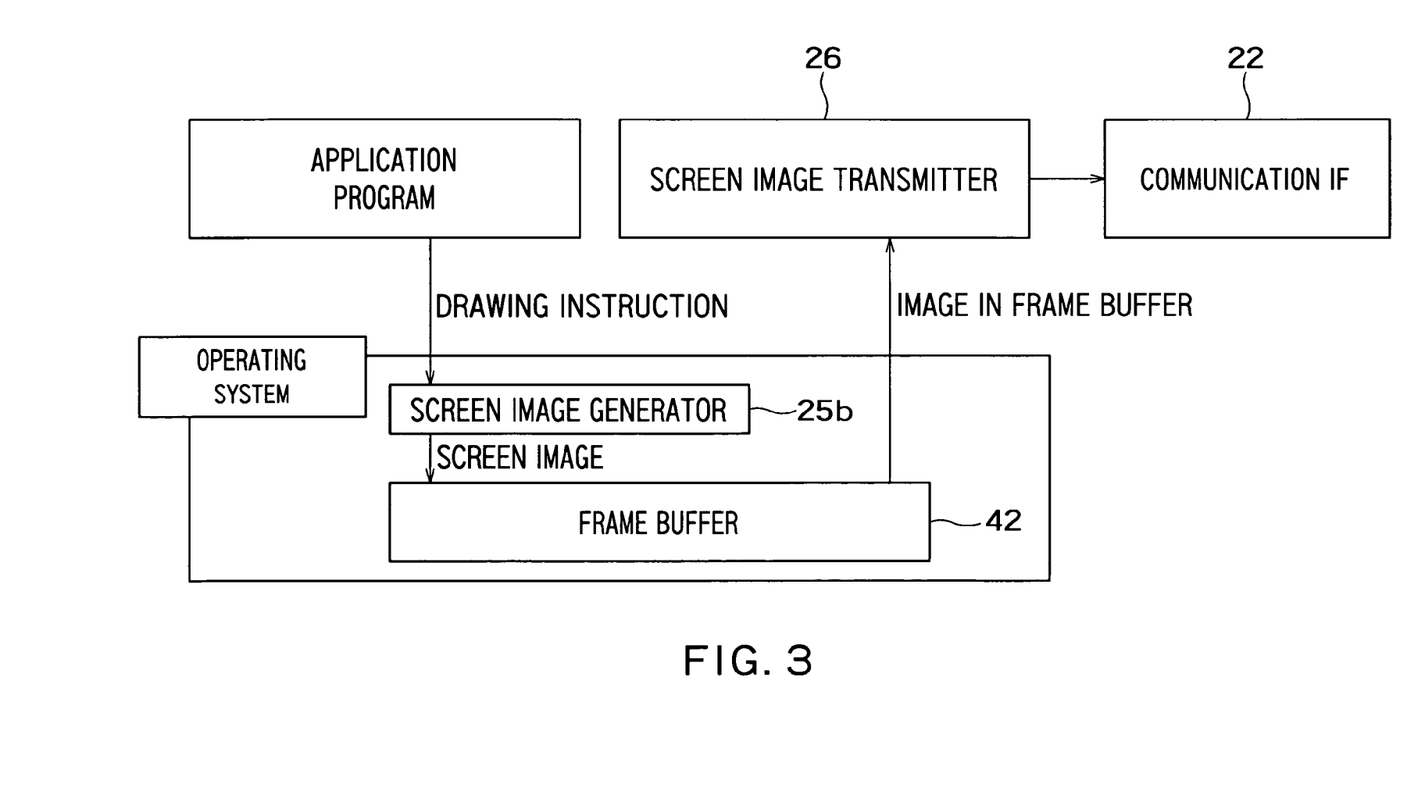
FIG. 3 is a diagram showing another configuration example of the screen image generator and the screen image transmitter.

FIG. 3 is a diagram showing another example of the screen image generator 25 and the screen image transmitter 26.

In the present example as well, the server apparatus 21 is a computer in which an application program operates on the OS. The server apparatus 21 includes a frame buffer 42 which retains a screen image to be displayed on the client apparatus 31. When the application program issues a drawing instruction to the OS, a screen image generator 25*b* in the OS writes a screen image (for example, an image in a region in the screen region) to be displayed on the client apparatus 31 into the frame buffer 42 on the basis of the given drawing instruction.

The screen image transmitter 26 converts the whole of the screen image data (screen image data corresponding to one frame) retained in the frame buffer 42 to a format which can be handled by the client apparatus 31, and transmits the resultant screen image data to the client apparatus 31. As for timing of transmission conducted by the screen image transmitter 26, the screen image transmitter 26 may transmit the resultant screen image data each time the OS updates contents of the frame buffer. Or the screen image transmitter 26 may conduct transmission at predetermined time intervals regardless of the frame buffer writing timing. As for the scheme of compression, the screen image taken out from the frame buffer 42 may be compressed separately every frame. In an alternative scheme, the screen image in the frame buffer transmitted in the past is retained, and compression is conducted by utilizing the correlation to the retained screen image.

Figure 4:
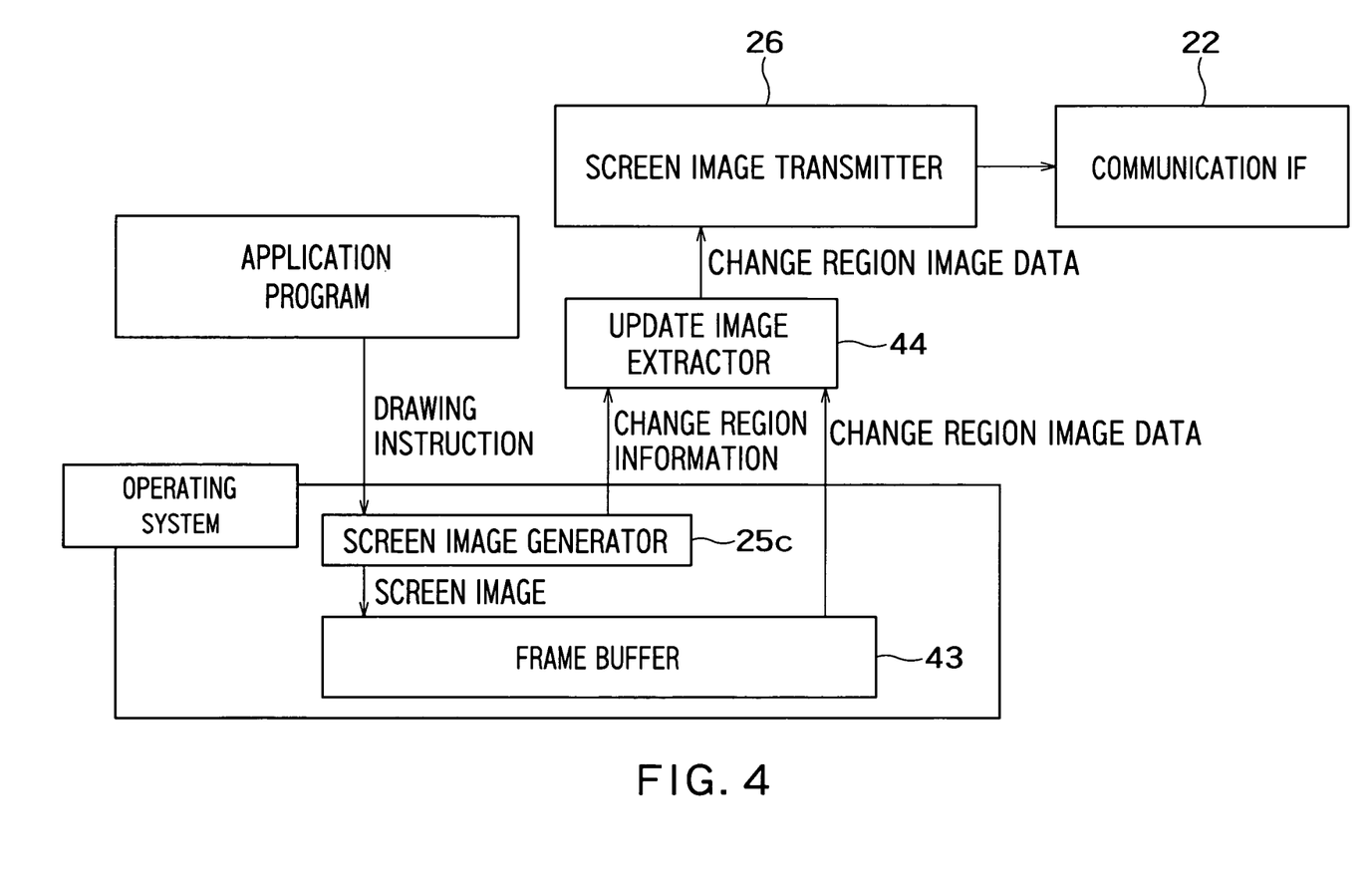
FIG. 4 is a diagram showing still another configuration example of the screen image generator and the screen image transmitter.

FIG. 4 is a diagram showing still another example of the screen image generator 25 and the screen image transmitter 26.

This example is the same as the operation example shown in FIG. 3 until a screen image generator 25*c* writes a screen image to be displayed on the client apparatus 31 into a frame buffer 43. The screen image generator 25*c* generates an image on the basis of a drawing instruction, updates the whole or a part of an image corresponding to one frame written in the frame buffer 43, and notifies an update image extractor 44 of region information representing where the updated region is located (for example, information representing the position and range of the image in the whole screen). This notice may be given each time the image is generated. The update image extractor 44 may be notified of regions of those images collectively after images in some regions in one frame have been generated.

The update image extractor 44 acquires an image of the updated region from the frame buffer 43 on the basis of the region information given as a notice, and delivers the acquired image to the screen image transmitter 26. The screen image transmitter 26 converts the received image to a format which can be handled by the client apparatus 31, and transmits a resultant image to the client apparatus 31 via the communication IF 22.

Figure 5:
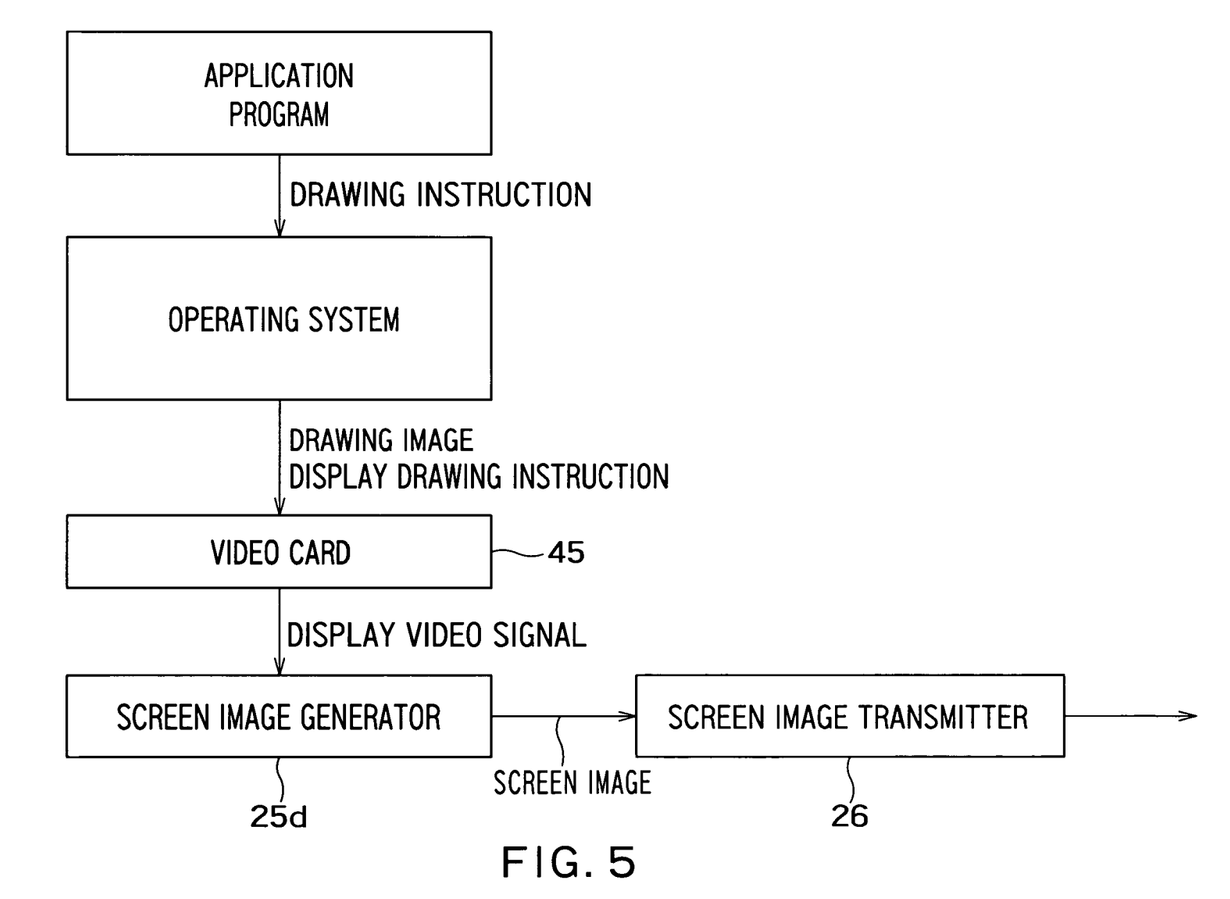
FIG. 5 is a diagram showing yet another configuration example of the screen image generator and the screen image transmitter.

If the server apparatus 21 includes an output IF for connection to the display which is not illustrated without the network 41, besides the communication IF 22 for connection to the network 41, then it is also possible to consider a configuration in which signals representing a screen image to be output to this display are transmitted to the client apparatus 31 via the network 41 and the screen image is displayed on the client apparatus 31. This configuration is shown in FIG. 5.

If an application program issues a drawing instruction to the OS, the OS generates an image on the basis of the given drawing instruction. The OS delivers the generated image and a display drawing instruction to a video card 45 included in the server apparatus 21. The video card 45 generates display video signals in accordance with the received display drawing instruction. A screen image generator 25*d* delivers these display video signals to the screen image transmitter 26 as a screen image.

If the server apparatus includes a VRAM (Video Random Access Memory) for output to the display, an image stored in the VRAM may be transmitted to the client apparatus and displayed thereon. In this case, for example the screen image generator generates an image to be written into the VRAM. The screen image transmitter 26 acquires video signals from the VRAM, converts contents of the video signals to a format which can be handled by the client apparatus 31, and transmits resultant signals to the client apparatus 31 via the communication IF 22.

In the client apparatus 31 shown in FIG. 1, screen image data (image data of an image on the whole screen or a region thereof) transmitted from the server apparatus 21 is received by the screen image receiver 33 via the communication IF 32. The screen image receiver 33 decodes the received image data if necessary, and writes a result into a frame buffer included in the display unit 36. When image data in one region in the screen region is sent, then display coordinates on the screen region and range information which indicates a display range are sent together with the image data. The client apparatus 31 writes the image data into the frame buffer in the display unit 36. The display unit 36 displays contents of the frame buffer.

The video stream processing determiner 24, the client capability information acquirer 23 and the video stream transferrer 27 in the server apparatus 21, and the video display position storer 35 and the video reproducer 34 in the client apparatus 31 will now be described in detail. The case where the client apparatus 31 conducts video phone operation with the video providing apparatus 11 (video phone) by using a video phone application program which operates in the server apparatus 21 will now be described as an example. By the way, it is supposed that a video phone application program is mounted on the video providing apparatus 11 separately.

Figure 7:
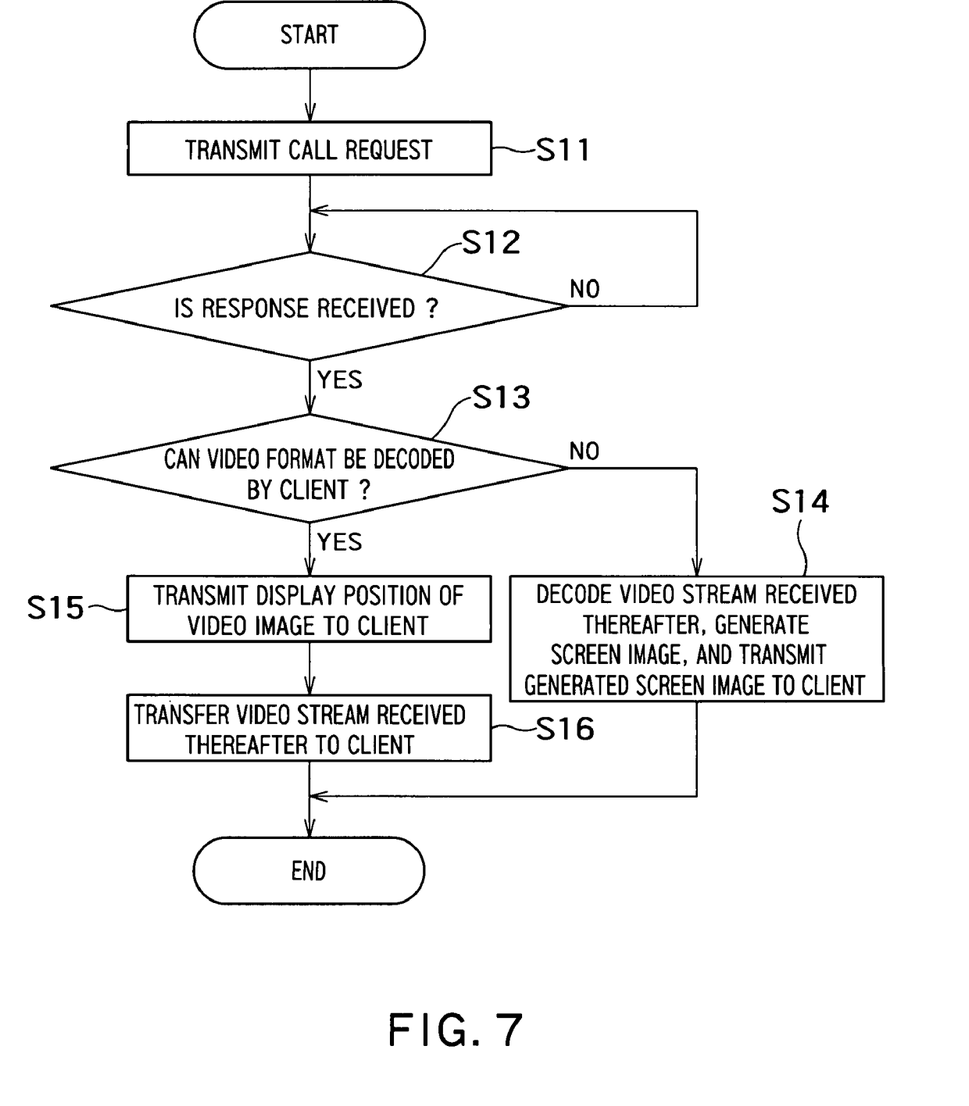
FIG. 7 is a diagram showing an example of a processing flow in a server apparatus.

FIG. 7 is a flow chart showing a processing flow in the server apparatus 21 in the present example.

It is attempted to connect the client apparatus 31 to the video providing apparatus 11 by using the video phone application program which operates on the server apparatus 21. A connection request to the server apparatus 21 is issued by, for example, the input unit 37 in the client apparatus 31. Alternatively, the input unit 37 may be connected to the network 41 to issue the connection request.

Figure 6:
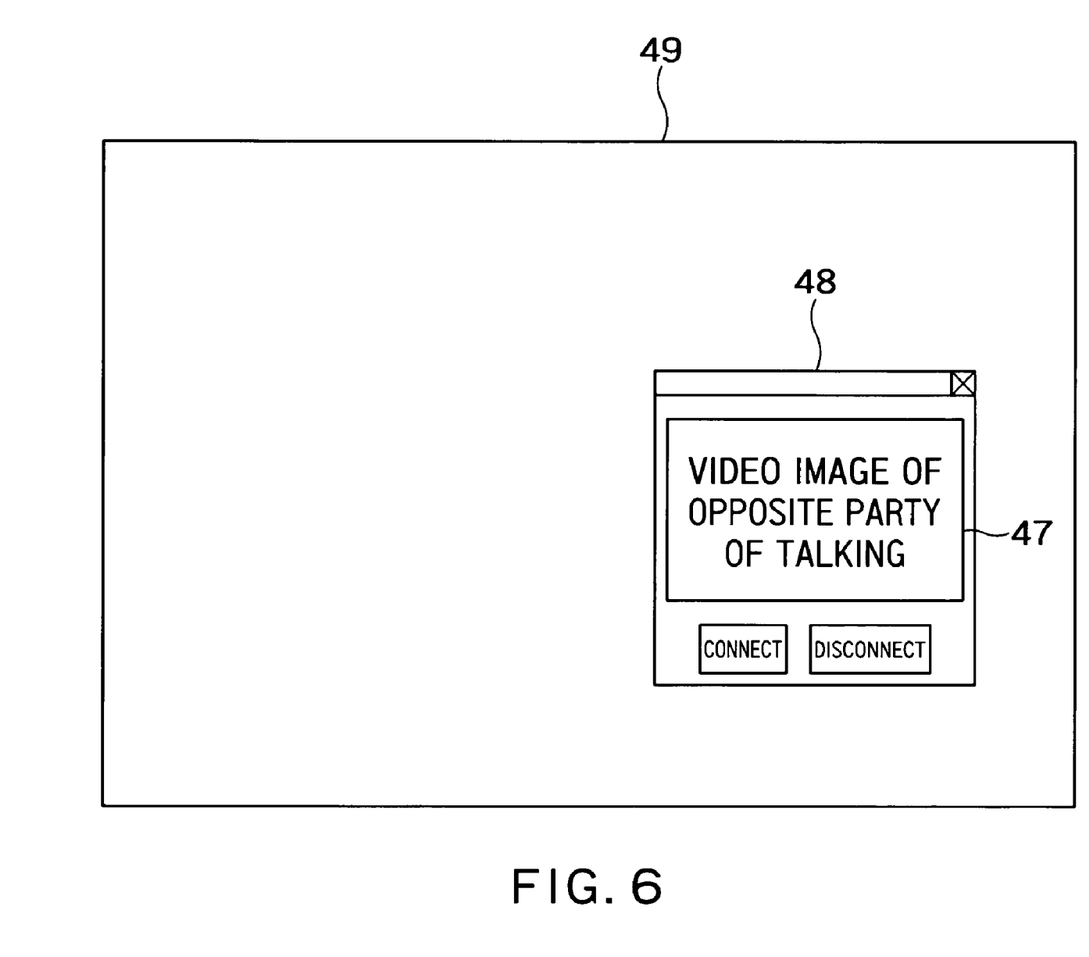
FIG. 6 is a diagram showing a display example of a video phone application program.

As shown in FIG. 6, the present video phone application program can display a video image 47 provided by the opposite party of talk (a user of the video providing apparatus 11) in a window 48 included in an image (screen image) 49 of the whole screen region. Upon receiving the connection request, the server apparatus 21 transmits a call request to the video providing apparatus 11 (S11). The server apparatus 21 waits for a response from the video providing apparatus 11 (NO at S12). If the server apparatus 21 receives the response from the video providing apparatus 11 (YES at S12), establishes connection between the client apparatus 31 and the video providing apparatus 11, and determines a video format (such as MPEG-2 or MPEG-4), the video stream processing determiner 24 determines whether the client apparatus can decode a video stream transmitted from the video providing apparatus 11, by using information obtained from the client capability information acquirer 23 (S13). Details of the client capability information acquirer 23 will be described later with reference to a third embodiment.

If the client apparatus 31 cannot decode the video stream (NO at S13), the screen image generator 25 decodes the video stream provided by the video providing apparatus 11, and generates screen images to be displayed on the client apparatus 31 one after another on the basis of the decoded video stream. The screen image transmitter 26 converts the generated screen image (for example, a change part from the previous screen image) to a format which can be handled by the client apparatus 31, and transmits a resultant screen image to the client apparatus 31 via the communication IF 22 (S14).

On the other hand, if the client apparatus 31 can decode the above-described video format (YES at S13), then the video stream processing determiner 24 transmits information which represents position in which the video image should be displayed (here, a position in which a video image of the opposite party of talking should be displayed, such as a position of a video image indicated by reference numeral 47 in FIG. 6) to the client apparatus 31 via the communication IF 22 (S15). Transmission of information of the position in which the video image should be displayed may be conducted, for example, only first once unless the display position is changed. The video stream transferrer 27 transmits (i.e., transfers) a video stream received from the video providing apparatus 11 to the client apparatus 31 without decoding it (S16).

Upon receiving the display position information of the video stream from the server apparatus 21, the client apparatus 31 stores the received display position information for the video display position storer 35. Upon receiving the video stream from the server apparatus 21 thereafter, the video reproducer 34 in the client apparatus 31 acquires the display position from the video display position storer 35 and reproduces the video stream in the specified display position.

Figure 8:
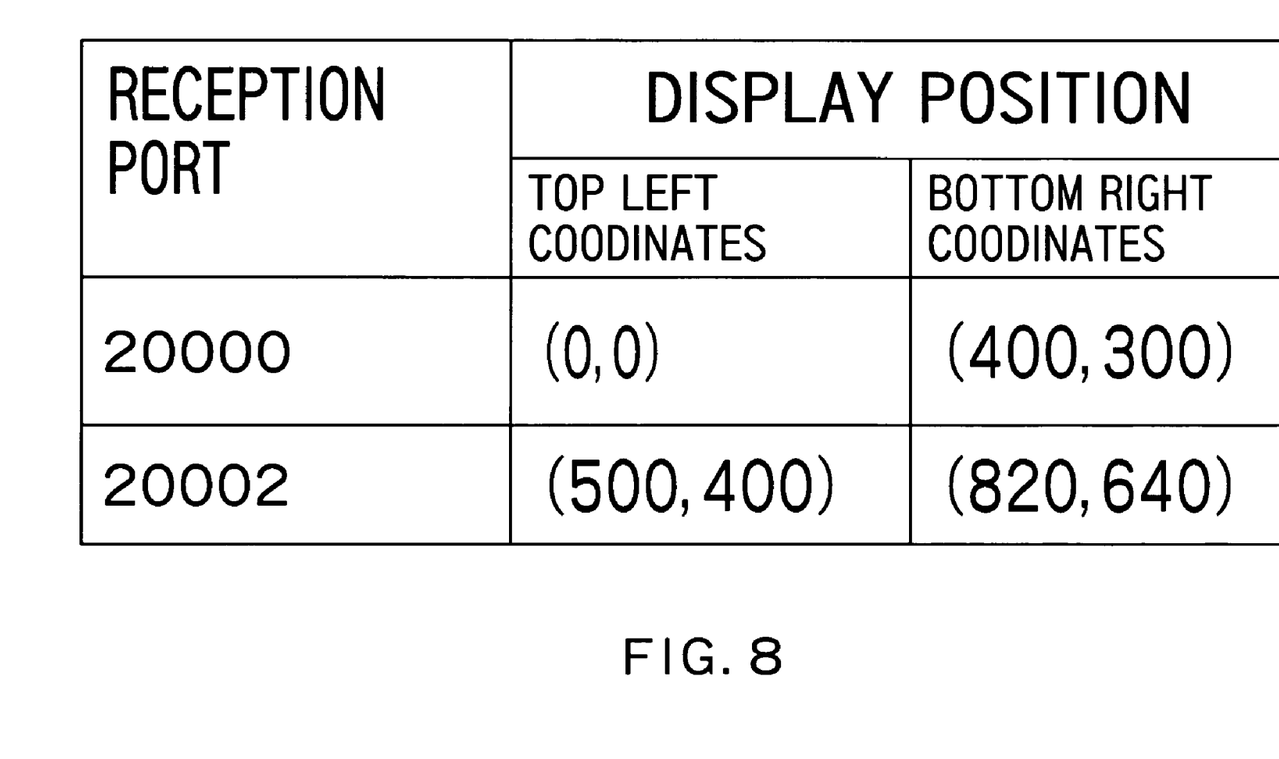
FIG. 8 is a diagram showing an example of information stored in a video display position storer.

If the client apparatus 31 is made to be capable of receiving a plurality of video streams at the same time, then the video display position storer 35 should store associations of display positions of respective video streams with received video streams. For example, when the server apparatus 21 gives a notice of the display position, therefore, the server apparatus 21 should give a notice of a reception port number which becomes the transmission destination of the video stream simultaneously and the client apparatus 31 should store the display position in association with the reception port number. An example of information which associates the reception port with the display position is shown in FIG. 8. Information on a first line means that a video stream received in a reception port No. 20000 in the client apparatus 31 should be reproduced in a rectangular region prescribed by top left coordinates (0, 0) and bottom right coordinates (400, 300) in the screen region. In the same way, information on a second line means that a video stream received in a reception port No. 20002 should be reproduced in a rectangular region prescribed by top left coordinates (500, 400) and bottom right coordinates (820, 640) in the screen region.

In the foregoing description, the application program which operates on the server apparatus has been supposed to be a video phone application program. However, the application program which operates on the server apparatus may be any application program, as long as it is an application program which receives a video image. For example, the application program which operates on the server apparatus may be an application program which reproduces a video stream such as movie contents.

According to the present embodiment, it is possible to reduce the delay and frame rate falling caused when displaying a video stream, as heretofore described.

Second Embodiment

Figure 9:
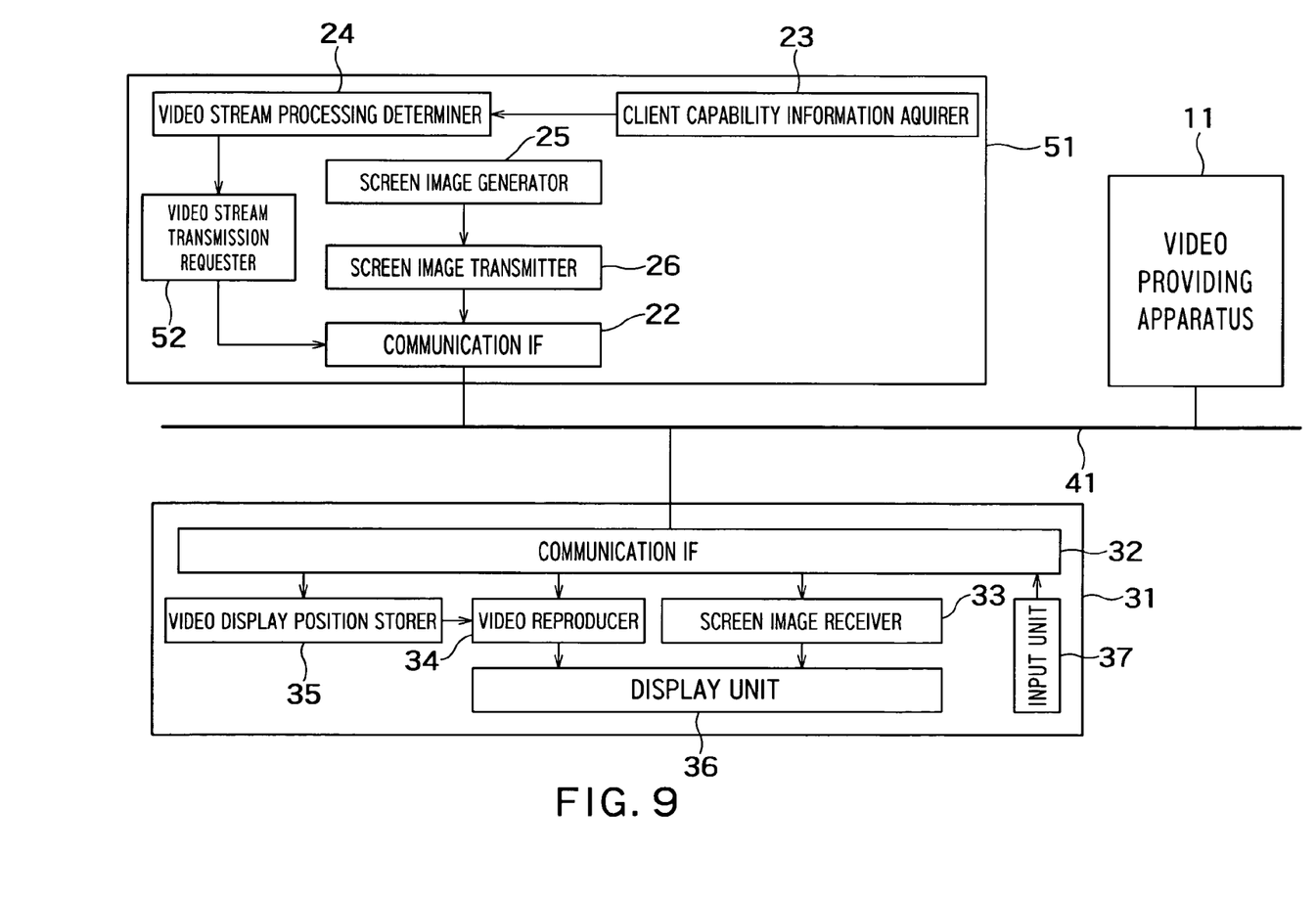
FIG. 9 is a diagram showing another example of a configuration of a video delivery system.

FIG. 9 is a block diagram showing a configuration of a video delivery system in a second embodiment. The second embodiment differs from the first embodiment in that a server apparatus 51 includes a video stream transmission requester 52.

Figure 10:
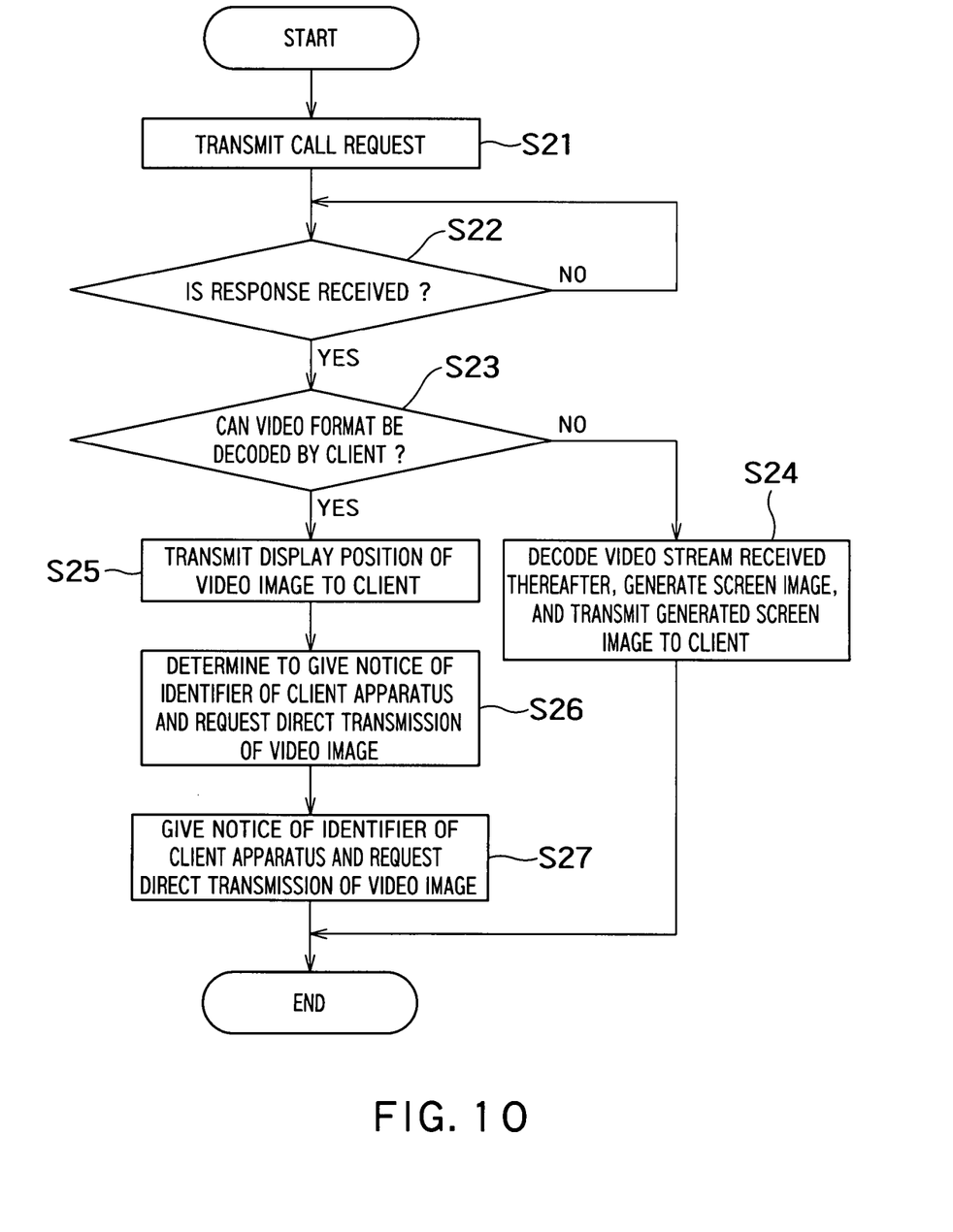
FIG. 10 is a diagram showing another example of a processing flow in a server apparatus.

FIG. 10 is a flow chart showing a processing flow in a server apparatus 51 in the second embodiment. The present embodiment differs from the first embodiment in processing conducted when the client apparatus 31 can decode the video stream provided by the video providing apparatus 11.

S21, S22, S23 and S24 are conducted in the same way as the first embodiment. S21, S22, S23 and S24 correspond to S11, S12, S13 and S14 in FIG. 7. If the client apparatus 31 can decode the above-described video format (YES at S23), the server apparatus 51 first transmits information of a position in which a video image should be displayed (a position in which a video image of the opposite party of talking should be displayed in a window of the video phone application program) to the client apparatus 31 (S25) in the same way as the first embodiment. Subsequently, the video stream processing determiner 24 in the server apparatus 51 determines to notify the video providing apparatus 11 of an identifier (such as, for example, an IP address) of the client apparatus 31. In addition, the video stream processing determiner 24 determines to request the video providing apparatus 11 to directly transmit a video stream to the client apparatus 31 (S26). Upon receiving the determination of the video stream processing determiner 24, the video stream transmission requester 52 notifies the video providing apparatus 11 of the identifier of the client apparatus 31, and requests the video providing apparatus 11 to transmit the video stream directly to the client apparatus 31 (S27). In other words, the video stream transmission requester 52 transmits a first request signal to the video providing apparatus 11. By the way, if the client apparatus 31 cannot decode the above-described video format (NO at S23), the video stream transmission requester 52 requests the video providing apparatus 11 to transmit the video stream to the server apparatus 51 (the communication IF 22). In other words, the video stream transmission requester 52 transmits a second request signal to the video providing apparatus 11.

Upon receiving the display position information of the video stream from the server apparatus 51, the client apparatus 31 stores the received display position information for the video display position storer 35. Upon receiving the video stream from the video providing apparatus 11, the video reproducer 34 acquires the display position from the video display position storer 35, and reproduces the provided video image in the specified display position.

According to such a procedure as well, the delay and frame rate falling caused when displaying the video stream can be reduced.

Third Embodiment

In a third embodiment, the client capability information acquirer 23 will be described in detail.

The client capability information acquirer 23 acquires capability information which represents the capability of the client apparatus 31. As for the capability of the client apparatus 31, there is, for example, a classification (such as MPEG-2, MPEG-4 or H.263) of the format of the screen image data which can be decoded by the client apparatus 31. The client capability information acquirer 23 acquires the capability information of the client apparatus 31 according to, for example, one of procedures described hereafter.

According to a first possible procedure, the client capability information acquirer 23 acquires the capability information of the client apparatus 31 from a capability information input unit provided for the user to input the identifier of the client apparatus 31 and capability information. The acquired capability information is stored in the server apparatus 21 in association with the identifier.

According to a second possible procedure, the client apparatus 31 notifies the client capability information acquirer 23 in the server apparatus 21 of capability information of the client apparatus 31 by using a communication route between the client apparatus 31 and the server apparatus 21 after the client apparatus 31 is connected to the server apparatus 21. The capability information is stored in the server apparatus 21.

According to a third possible procedure, the client capability information acquirer 23 sends an inquiry signal to the client apparatus 31 when an inquiry concerning the capability information of the client apparatus 31 is sent from the video stream processing determiner 24. As a result, the capability information is acquired.

The server apparatus 21 may retain an identifier of a connection destination (such as a port number in TCP (Transmission Control Protocol) or UDP (User Datagram Protocol) when using an IP (Internet Protocol) which can receive a video stream, together with such capability information. The video stream transferrer 27 shown in FIG. 1 can transfer the video stream to the client apparatus 31 by utilizing this port number. In the case where the port number is not retained, the client capability information acquirer 23 may inquire of the client apparatus 31 about a port number which can receive the video stream, before transferring the video stream. For example, a port number which can receive the video stream can be obtained by using the SIP (Session Initiation Protocol).

Furthermore, it is desirable that the client capability information acquirer 23 can inspect whether a new stream can be decoded on the basis of the number of video streams which can be decoded simultaneously by the client apparatus 31 and the number of streams which are being decoded currently. The reason is as follows: even if the client apparatus 31 has a capability of decoding a certain video format, the client apparatus 31 cannot decode an additional video stream while decoding a certain stream, when the number of video streams which can be decoded simultaneously is one. This can be implemented by, for example, storing the number of streams which can be decoded simultaneously and the number of streams which are being utilized currently besides a classification of video format which can be decoded by the client apparatus 31, in the server apparatus 21 or the client apparatus 31. The client capability information acquirer 23 can answer accurately whether a video stream to be received thereafter can be decoded by the client apparatus 31. If the decoding is impossible from the viewpoint of the number, the video stream processing determiner determines to, for example, decode a video stream, place it as a part of a screen image, and transmit a resultant screen image.

If the client apparatus 31 is operating by using power supplied from a battery, the client capability information acquirer 23 may acquire the residual quantity of the battery in the client apparatus 31 as the capability information of the client apparatus 31. The video stream processing determiner 24 acquires residual quantity information of the battery from the client capability information acquirer 23. If the residual quantity of the battery is small (equal to or less than a threshold), the video stream processing determiner 24 decodes a video stream without transferring the video stream to the client apparatus 31, generates a screen image having the provided image placed as a part of the screen image, and transmits a resultant screen image to the client apparatus 31. As a result, it becomes unnecessary for the client apparatus 31 to bear the power required to decode the video stream. Therefore, the power consumption in the client apparatus 31 can be reduced, and the utilization time of the client apparatus 31 can be lengthened. Such an effect can be obtained, for example, when the power source has a limited capacity, such as when the power source for the client apparatus 31 is a battery, and the decoding load (such as the arithmetic operation quantity) of the video stream for the client apparatus 31 is heavier than the decoding load of the screen image. Even when a decoder for the screen image for the client apparatus 31 is separate from a decoder for the video stream, the above-described effect can be obtained by stopping the decoder for the video stream. The present processing can be conducted not only at the time when reception of a video stream is started but also when the video stream is being received.

Fourth Embodiment

It is desirable that the capability information of the client apparatus 31 includes resizing possibility information which represents whether the client apparatus 31 can upscale and downscale (i.e., resize) a video image of the video stream obtained after decoding.

Here, the case where the video phone application program mounted on the server apparatus 21 can display an upscaled or downscaled video image will now be described as an example. Furthermore, it is supposed that the video stream which is being transmitted by the video providing apparatus 11 has a format which can be decoded by the client apparatus and the server apparatus 21 transfers the received video stream from the video stream transferrer 27 to the client apparatus 31 as it is. However, the ensuing description may be applied to the case where the video stream is being directly transmitted from the video providing apparatus 11 to the client apparatus 31 (for example, the case of the second embodiment).

For example, if the server apparatus 21 is requested to conduct upscale display or downscale display of a video image by the input unit 37 in the client apparatus 31 according to user's operation (i.e., if instruction information is input), the video stream processing determiner 24 inquires of the client capability information acquirer 23 whether the video image can be upscaled or downscaled in the client apparatus 31. If upscaling or downscaling to the size specified by the user is possible as a result of the inquiry, the video stream processing determiner 24 notifies the client apparatus 31 of, for example, a display region after upscaling or downscaling (position information on the screen of the client apparatus 31) as information concerning the scaling factor after the change. If upscaling or downscaling cannot be conducted, transfer of the video stream conducted by the video stream transferrer 27 is finished (in the case where the present embodiment is applied to the second embodiment, a stop request signal for requesting stop of transmission of the video stream to the client apparatus 31 is transmitted to the video providing apparatus 11). And the server apparatus 21 generates a screen image from the received video stream by using the screen image generator 25. (In the case where the present embodiment is applied to the second embodiment, a second request signal for requesting transmission of the video stream to the server apparatus 51 is first transmitted to the video providing apparatus 11 beforehand.) Subsequently, the server apparatus 21 transmits the screen image to the client apparatus 31 by using the screen image transmitter 26.

As a result, it is possible to prevent a display which is not intended by the user from being conducted in the client apparatus 31.

As processing in the case where upscaling or downscaling cannot be conducted in the client apparatus 31, a method of notifying the user that upscaling or downscaling cannot be conducted without finishing the transfer of the video stream is also conceivable. Specifically, it is conceivable to generate a screen image which represents that upscaling or downscaling cannot be conducted and transmit the screen image to the client apparatus 31.

Furthermore, if upscaling or downscaling cannot be conducted in the client apparatus 31 and upscaling or downscaling can be conducted in the video providing apparatus 11, the video providing apparatus 11 may be requested to transmit a stream of an upscaled video image or a downscaled video image, as a third request signal from the server apparatus.

Heretofore, upscaling and downscaling have been described as the operation for the video image. However, the same is true of other operations (such as a contrast change).

Fifth Embodiment

It is supposed that a received video display window in the client apparatus 31 is completely hidden behind a window of another application program by an instruction given by the user of the client apparatus 31 in the above-described video phone application program. In such a case, it is not necessary to transfer the received video stream to the client apparatus 31.

The video stream processing determiner 24 confirms the display state of the video stream in the screen region of the client apparatus 31. If the display of the video stream is completely hidden, transfer of the video image conducted by the video stream transferrer 27 is stopped. As a result, traffic between the server apparatus 21 and the client apparatus 31 can be reduced. Furthermore, since the processing quantity of the client apparatus 31 can also be made small, power consumption of the client apparatus 31 can be reduced.

Also in the case where a great part of the video stream (for example, a region having a ratio equal to or greater than the threshold in the display region of the video stream) is hidden and the user of the client apparatus 31 is considered to be not paying attention to the video stream, similar processing may be conducted.

Or if a great part of the video stream is thus hidden, the server apparatus 21 may generate a screen image from a video stream by using the screen image generator 25 and the screen image transmitter 26 without using the video stream transferrer 27 (or without conducting direct transmission from the video providing apparatus 11), and transmit the generated screen image to the client apparatus 31. In this case as well, it is sufficient for the server apparatus 21 to transmit only an image of a displayed part to the client apparatus 31. As a result, the traffic between the server apparatus 21 and the client apparatus 31 can be reduced. Furthermore, the processing quantity of the client apparatus 31 can also be reduced. Accordingly, the power consumption of the client apparatus 31 can be reduced.

If a great part of the video stream is not hidden, it is more desirable to transfer the video stream by using the video stream transferrer 27 (or transmit directly from the video providing apparatus 11) from the viewpoint of delay reduction. In this case, the video stream processing determiner 24 notifies the client apparatus 31 of the displayed part (the part which is not hidden) accurately as the display position of the video image.

What is claimed is:

1. A server apparatus comprising:
   a video stream receiver configured to receive a first video stream encoded by using a first coding scheme from a video providing apparatus connected via a network;
   a video stream generator configured to generate a second video stream obtained by converting a coding scheme of the first video stream from the first coding scheme to a second coding scheme;
   a client capability information acquirer configured to acquire decoding capability information representing whether a client apparatus can decode a video image encoded by using the first coding scheme; and
   a video stream processing determiner configured to transmit the first video stream to the client apparatus when the client apparatus can decode the video image encoded by using the first coding scheme, and configured to transmit the second video stream to the client apparatus when the client apparatus cannot decode the video image encoded by using the first coding scheme,
   wherein the video stream processing determiner transmits the first video stream together with information which represents a position of a video image represented by the first video stream, on a screen of the client apparatus.

2. A server apparatus comprising:
   a video stream receiver configured to receive a first video stream encoded by using a first coding scheme from a video providing apparatus connected via a network;
   a video stream generator configured to generate a second video stream obtained by converting a coding scheme of the first video stream from the first coding scheme to a second coding scheme;
   a client capability information acquirer configured to acquire decoding capability information representing whether a client apparatus can decode a video image encoded by using the first coding scheme; and
   a video stream processing determiner configured to transmit the first video stream to the client apparatus when the client apparatus can decode the video image encoded by using the first coding scheme, and configured to transmit the second video stream to the client apparatus when the client apparatus cannot decode the video image encoded by using the first coding scheme,
   wherein the client capability information acquirer acquires information which represents a residual quantity in a battery of the client apparatus, as the client capability information, and the video stream processing determiner transmits the second video stream, when the acquired residual quantity in the battery is equal to or less than a threshold.

3. A server apparatus comprising:
a video stream receiver configured to receive a first video stream encoded by using a first coding scheme from a video providing apparatus connected via a network;
a video stream generator configured to generate a second video stream obtained by converting a coding scheme of the first video stream from the first coding scheme to a second coding scheme;
a client capability information acquirer configured to acquire decoding capability information representing whether a client apparatus can decode a video image encoded by using the first coding scheme; and
a video stream processing determiner configured to transmit the first video stream to the client apparatus when the client apparatus can decode the video image encoded by using the first coding scheme, and configured to transmit the second video stream to the client apparatus when the client apparatus cannot decode the video image encoded by using the first coding scheme,
wherein
the client capability information acquirer acquires information concerning a number of video streams which can be decoded simultaneously by the client apparatus, as the client capability information, and
the video stream processing determiner transmits the second video stream, when the number of video streams which are being decoded in the client apparatus reaches the number indicated in the acquired information.

4. A server apparatus comprising:
a video stream receiver configured to receive a first video stream encoded by using a first coding scheme from a video providing apparatus connected via a network;
a video stream generator configured to generate a second video stream obtained by converting a coding scheme of the first video stream from the first coding scheme to a second coding scheme;
a client capability information acquirer configured to acquire decoding capability information representing whether a client apparatus can decode a video image encoded by using the first coding scheme;
a video stream processing determiner configured to transmit the first video stream to the client apparatus when the client apparatus can decode the video image encoded by using the first coding scheme, and configured to transmit the second video stream to the client apparatus when the client apparatus cannot decode the video image encoded by using the first coding scheme;
an instruction information receiver configured to receive instruction information which instructs change of video image scaling factor, from the client apparatus,
wherein
the client capability information acquirer acquires scaling factor information which represents one or more scaling factors with which the client apparatus can scale a video image of the first video stream, as the client capability information, and
the video stream processing determiner notifies the client apparatus of position information on a screen of a video image after scaling, when a scaling factor instructed by the instruction information is included in the scaling factor information.

5. The apparatus according to claim 4, wherein when the scaling factor instructed by the instruction information is not included in the scaling factor information, the video stream processing determiner stops transmission of the first video stream and transmits the second video stream to the client apparatus.

6. The apparatus according to claim 4, wherein when the scaling factor instructed by the instruction information is not included in the scaling factor information, the video stream processing determiner transmits a video stream encoded by using the second coding scheme, which includes a video image representing that video image scaling cannot be conducted, to the client apparatus.

7. The apparatus according to claim 4, wherein when the scaling factor instructed by the instruction information is not included in the scaling factor information, the video stream processing determiner requests the video providing apparatus to transmit a first video stream scaled with the scaling factor instructed by the instruction information.

8. A server apparatus comprising:
a video stream receiver configured to receive a first video stream encoded by using a first coding scheme from a video providing apparatus connected via a network;
a video stream generator configured to generate a second video stream obtained by converting a coding scheme of the first video stream from the first coding scheme to a second coding scheme;
a client capability information acquirer configured to acquire decoding capability information representing whether a client apparatus can decode a video image encoded by using the first coding scheme; and
a video stream processing determiner configured to transmit the first video stream to the client apparatus when the client apparatus can decode the video image encoded by using the first coding scheme, and configured to transmit the second video stream to the client apparatus when the client apparatus cannot decode the video image encoded by using the first coding scheme,
wherein when in a display region of the first video stream in the client apparatus a proportion of a region in which the video image of the first video stream is hidden by another image is equal to or greater than a threshold, the video stream processing determiner stops transmission of the first video stream.

9. The apparatus according to claim 8, wherein the video stream processing determiner transmits the second video stream including a part of the video image of the first video stream, which is not hidden by the another image to the client apparatus.

10. A server apparatus comprising:
a video stream receiver configured to receive a first video stream encoded by using a first coding scheme from a video providing apparatus connected via a network;
a video stream generator configured to generate a second video stream obtained by converting a coding scheme of the first video stream from the first coding scheme to a second coding scheme;
a client capability information acquirer configured to acquire decoding capability information representing whether a client apparatus can decode a video image encoded by using the first coding scheme; and
a video stream processing determiner configured to transmit a first request signal to the video providing apparatus to request transmission of the first video stream to the client apparatus, when the client apparatus can decode the video image encoded by using the first coding scheme, and transmit a second request signal to the video providing apparatus to request transmission of the first video stream to the video stream receiver and transmit the second video stream generated by the video stream generator to the client apparatus, when the client apparatus cannot decode the video image encoded by using the first coding scheme.

11. The apparatus according to claim 10, wherein the video stream processing determiner transmits information which represents a position of a video image represented by the first video stream, on a screen of the client apparatus to the client apparatus, when the client apparatus can decode the video image encoded by using the first coding scheme.

12. The apparatus according to claim 10, wherein the client capability information acquirer acquires information which represents a residual quantity in a battery of the client apparatus, as the client capability information, and the video stream processing determiner transmits the second request signal to the video providing apparatus, when the residual quantity is equal to or less than a threshold.

13. The apparatus according to claim 10, wherein the client capability information acquirer acquires information concerning a coding scheme which can be decoded by the client apparatus, as the client capability information, and the video stream processing determiner determines whether the client apparatus can decode the video image encoded by using the first coding scheme on the basis of acquired information.

14. The apparatus according to claim 10, wherein the client capability information acquirer acquires information concerning a number of video streams which can be decoded simultaneously by the client apparatus, as the client capability information, and the video stream processing determiner transmits the second request signal, when the number of video streams which are being decoded in the client apparatus reaches the number indicated in the acquired information.

15. The apparatus according to claim 10, further comprising:

an instruction information receiver configured to receive instruction information which instructs change of video image scaling factor, from the client apparatus, wherein the client capability information acquirer acquires scaling factor information which represents one or more scaling factors with which the client apparatus can scale a video image of the first video stream, as the client capability information, and the video stream processing determiner notifies the client apparatus of position information on a screen of a video image after scaling, when a scaling factor instructed by the instruction information is included in the scaling factor information.

16. The apparatus according to claim 15, wherein when the scaling factor instructed by the instruction information is not included in the scaling factor information, the video stream processing determiner transmits a stop request signal to the video providing apparatus to request stop of transmission of the first video stream and transmits the second request signal to the video providing apparatus.

17. The apparatus according to claim 15, wherein when the scaling factor instructed by the instruction information is not included in the scaling factor information, the video stream processing determiner transmits a video stream encoded by using the second coding scheme, which includes a video image representing that video image scaling cannot be conducted, to the client apparatus.

18. The apparatus according to claim 15, wherein when the scaling factor instructed by the instruction information is not included in the scaling factor information, the video stream processing determiner transmits a third request signal to the video providing apparatus to request transmission of a first video stream scaled with the scaling factor instructed by the instruction information.

19. The apparatus according to claim 10, wherein when in a display region of the first video stream in the client apparatus a proportion of a region in which the video image of the first video stream is hidden by another image is equal to or greater than a threshold, the video stream processing determiner transmits a stop request signal for requesting stop of transmission of the first video stream to the video providing apparatus, transmits the second request signal to the video providing apparatus, and transmits the second video stream including a part of the video image of the first video stream, which is not hidden by the another image to the client apparatus.

20. The apparatus according to claim 10, wherein the client capability information acquirer acquires the client capability information by sending an inquiry signal to the client apparatus or on the basis of user's input.

21. A video delivery method comprising:

receiving a first video stream encoded by using a first coding scheme from a video providing apparatus connected via a network;

acquiring decoding capability information representing whether a client apparatus can decode a video image encoded by using the first coding scheme;

transmitting the first video stream together with information which represents a position of a video image represented by the first video stream, on a screen of the client apparatus, to the client apparatus, when the client apparatus can decode the video image encoded by using the first coding scheme; and generating a second video stream obtained by converting a coding scheme of the first video stream from the first coding scheme to a second coding scheme and transmitting the second video stream to the client apparatus, when the client apparatus cannot decode the video image encoded by using the first coding scheme.

22. A video delivery method comprising:

acquiring decoding capability information representing whether a client apparatus can decode a video image encoded by using a first coding scheme;

requesting a video providing apparatus connected via a network to transmit a first video stream encoded by using the first coding scheme to the client apparatus, when the client apparatus can decode the video image encoded by using the first coding scheme; and receiving the first video stream from the video providing apparatus, generating a second video stream obtained by converting a coding scheme of the first video stream from the first coding scheme to a second coding scheme and transmitting the second video stream to the client apparatus, when the client apparatus cannot decode the video image encoded by using the first coding scheme.

* * * * *